United States Patent [19]

Iwaya et al.

[11] 4,312,026
[45] Jan. 19, 1982

[54] CHIP CERAMIC CAPACITOR

[75] Inventors: Shoichi Iwaya, Kisagata; Sho Masujima, Tokyo, both of Japan

[73] Assignee: TDK Electronics Co., Ltd., Tokyo, Japan

[21] Appl. No.: 135,094

[22] Filed: Mar. 28, 1980

[30] Foreign Application Priority Data

| Apr. 11, 1979 | [JP] | Japan | 54-47635[U] |
| Apr. 11, 1979 | [JP] | Japan | 54-47636[U] |
| May 31, 1979 | [JP] | Japan | 54-73779[U] |

[51] Int. Cl.³ .................. H01G 4/12; H01G 4/38
[52] U.S. Cl. .................. 361/321; 361/308; 361/309; 361/311; 361/328
[58] Field of Search ............ 361/321, 328, 329, 301, 361/308, 309, 311; 174/112

[56] References Cited

U.S. PATENT DOCUMENTS

| 2,389,419 | 11/1945 | Deyrup | 361/321 X |
| 2,566,666 | 9/1951 | Khouri | 361/321 X |
| 2,939,059 | 5/1960 | Gravley | 361/308 X |
| 3,175,137 | 3/1965 | Huber | 361/301 X |
| 3,466,513 | 9/1969 | Belko | 361/321 X |
| 3,590,348 | 6/1971 | Bertics | 361/321 X |
| 3,838,320 | 9/1974 | Klein | 361/303 |
| 3,896,354 | 7/1975 | Coleman | 361/321 |
| 4,047,240 | 9/1977 | Insetta | |

FOREIGN PATENT DOCUMENTS

| 1068319 | 5/1967 | United Kingdom | 361/321 |
| 1362519 | 8/1974 | United Kingdom | 174/112 |

*Primary Examiner*—Elliot A. Goldberg
*Attorney, Agent, or Firm*—Armstrong, Nikaido, Marmelstein & Kubovcik

[57] ABSTRACT

A chip capacitor which has a substantially rectangular dielectric body having a pair of long sides, a pair of short sides perpendicular to said long sides, a pair of conductive confronting electrodes attached on the surface of the dielectric body so that the electrodes sandwich the dielectric body, a pair of terminals each provided along the related short side of the dielectric body and being electrically connected to the related electrode, and the junction point of each long side and each short side of the dielectric body is recessed. Preferably, the dielectric body is tapered towards the short sides.

9 Claims, 32 Drawing Figures

CHIP CERAMIC CAPACITOR

BACKGROUND OF THE INVENTION

The present invention relates to an improved structure of a capacitor, in particular, relates to the improved structure of a chip type ceramic capacitor.

A chip type capacitor comprises of a dielectric block, a pair of conductive electrodes embedded in the block or provided on the surface of the block, and a pair of terminals at opposite ends of the block. A chip type capacitor has the advantages that the size is small, a large capacitance is obtained in a small size of capacitor, the high density of mounting on a printed circuit board is possible by bonding the chip type capacitor on a flat conductive pattern, the high frequency operation is superior, and the external shape is common. Therefore, the automatic assembling and/or the automatic mounting of a capacitor is possible. Accordingly, a chip type capacitor is used in electronics appliances including miniature radio sets, tape recorders, an electric calculators, and/or electronic tuners in television sets, and the amount of capacitors utilized in those electronics appliances is increasing rapidly.

Figure 1A:
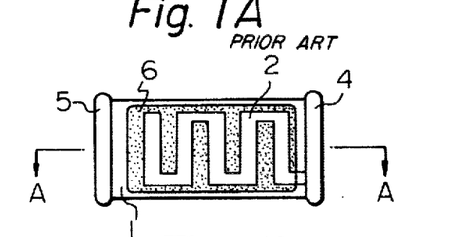
FIG. 1A is the plane view of a prior chip capacitor.
Figure 1B:
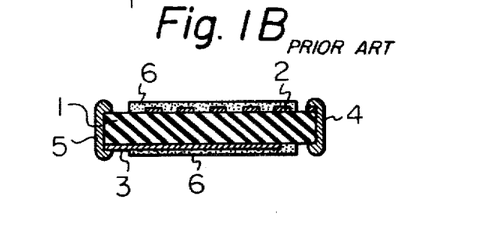
FIG. 1B is the vertical cross sectional view at the line A—A of the chip capacitor shown in FIG. 1A, FIGS. 2A and 2B show the manufacturing process of a prior chip capacitor.

FIGS. 1A and 1B show a structure of a prior chip type capacitor. In those figures, a dielectric body 1 which is 50–100$\mu$ of thickness made of Barium-titanate or titanium oxide, has a pair of electrodes 2 and 3 on both the surface of said dielectric body 1. A pair of terminals 4 and 5 are provided at opposite ends of the block 1 so that those terminals 4 and 5 are electrically connected to the electrodes 2 and 3, respectively. The reference numeral 6 is a protective layer made of glass or plastics provided on the surface of the electrodes 2 and 3 for improving the insulation and to resist against the chemical corrosion of electrodes 2 and 3.

FIGS. 1A and 1B show the embodiment of a trimming capacitor in which a trimming electrode 2 is trimmed for fine adjustment of the capacitance through trimming by sandblastes, a diamond cutter, or a laser beam. However, other types of chip capacitors are of course possible, like a single layer type capacitor having a dielectric body and a pair of electrodes embedded in the dielectric body, a laminated layer type capacitor having a dielectric body and laminated electrodes in said body, and/or a fixed type capacitor which is not trimmed.

Figure 2A:
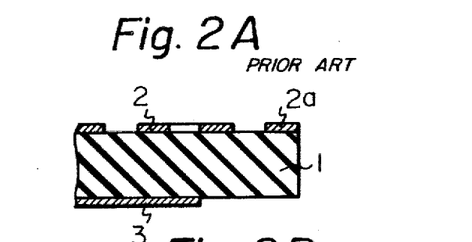
Figure 2B:
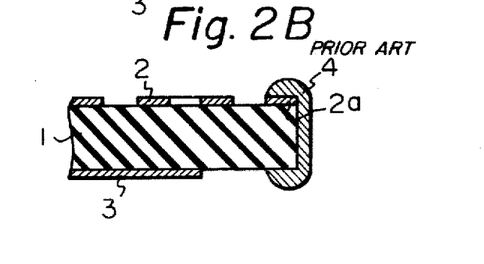

FIGS. 2A and 2B show a part of the manufacturing process of a chip capacitor. First, the structure as shown in FIG. 1A is prepared. In FIG. 1A, electrode patterns 2, 2a and 3 are attached on the surface of the dielectric body 1. Next, the terminal 4 is provided on the side of the dielectric body 1 by painting silver paste with a brush so that the terminal 4 or the silver paste is electrically connected to one of the electrode patterns. Similarly, the other terminal (not shown) is painted on the opposite side of the dielectric body so that the terminal is electrically connected to the other electrode pattern. Finally, the whole body is sintered or heated in a furnace.

However, a prior chip capacitor has the disadvantages as described below.

Figure 3A:
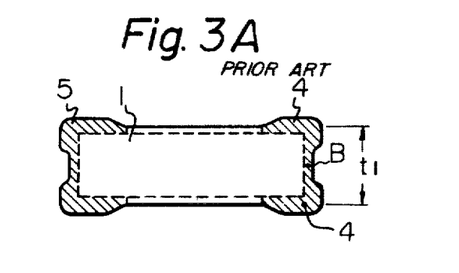
FIG. 3A is the enlarged vertical view of a prior chip capacitor.

When silver paste is painted on a capacitor assembly shown in FIG. 2A, there is the tendency that the thickness of the paint at an edge of the dielectric body is thin. Therefore, in order to provide the sufficient thickness at an edge portion, the painting is repeated several times. However, in the repetition of the painting, the portion except the edges is also painted inevitably. Therefore, the thickness of the silver paste at the portion A near the edge becomes thicker than the other portion B as shown in FIG. 3A. Further, since the silver paste is painted by a brush, the thickness of the paste is not always constant. And since the thickness $t_1$ of a chip capacitor is usually very thin, and is around 1 mm, the ratio of the thickness of the silver paste to the entire thickness of a capacitor ($t_1$) is rather large.

Figure 3B:
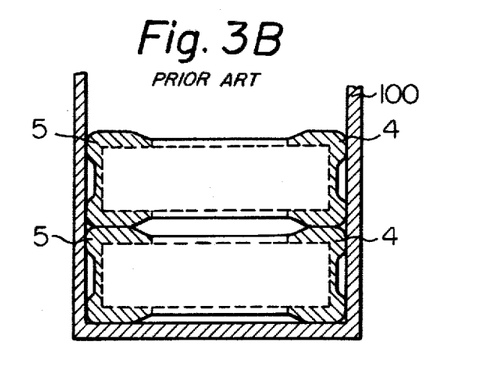
FIG. 3B is the stacked capacitors according to a prior art.

Accordingly, when a plurality of chip capacitors are arranged in line on a plane, or stacked in the magazine 100 as shown in FIG. 3B, the terminals disturb the easy handling of chip capacitors. In particular, a prior chip capacitor has the disadvantages that the automatic production of a chip capacitor is difficult, and the automatic mounting of a chip capacitor on a printed circuit board is also difficult. In particular, when chip capacitors are secured or stacked in the magazine 100 as shown in FIG. 3B, the number of chip capacitors stacked in the magazine 100 is reduced because of the thick terminals, thus, the efficiency for automatic mounting of capacitors on a printed circuit using a magazine is reduced. Further, since the thickness of terminals is not always constant, the stability of mounting capacitors when stacked in a magazine is bad, and the trouble occurs frequently when an automatic mounting of a capacitor to a printed circuit board is carried out.

Figure 3C:
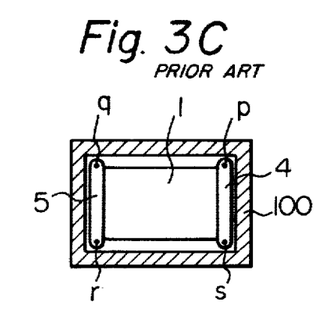
FIG. 3C is the top view of the stacked capacitors of FIG. 3B.

Further, since the painted terminals have the large portions p, q, r and s at the corners of the half assembly as shown in FIG. 3C, the size of a magazine for stacking capacitors must be enough to hold those large portions. However, the size of those large portions are not always constant because of the painting, the size of a magazine must be large enough to hold even when those large portions are the maximum size. Therefore, when those large portions are medium sized, an inevitable air gap is provided between a capacitor and the inner wall of a magazine, and a capacitor can not be stacked tightly in a magazine. The loose stacking of a capacitor in a magazine causes trouble when an automatic mounting of a capacitor on a printed circuit board is carried out.

Another disadvantage of a prior chip capacitor is that the structure is mechanically weak and is easily broken, since the thickness of a capacitor is thin.

Still another disadvantage of a prior chip capacitor is that the error of the capacitance is relatively large due to the error in the manufacturing process.

SUMMARY OF THE INVENTION

It is an object, therefore, of the present invention to overcome the disadvantages and limitations of a prior chip capacitor by providing a new and improved chip capacitor.

It is also an object of the present invention to provide a chip capacitor in which the feature for stacking and/or the plane arrangement is improved.

Another object of the present invention is to provide a chip chapacitor in which the error of the capacitance due to the manufacturing error is reduced.

The above and other objects are attained by a chip capacitor comprising of a substantially rectangular dielectric body having a pair of parallel long sides and a pair of parallel short sides perpendicular to said long sides, at least a pair of conductive confronting electrodes sandwiching at least a part of said dielectric body, a pair of terminals each provided along the related short side of the dielectric body and being electrically connected to the related electrode, and the junction point of each long side and each short side of the dielectric body being recessed.

Preferably, said dielectric body is tapered towards the short sides so that the thickness at the center is thicker than the thickness at the extreme ends.

BRIEF DESCRIPTION OF THE DRAWINGS

The foregoing and other objects, features, and attendant advantages of the present invention will be highly understood as the same become better understood by means of the following description and accompanying drawings wherein.

DESCRIPTION OF THE PREFERRED EMBODIMENTS

Figure 4:
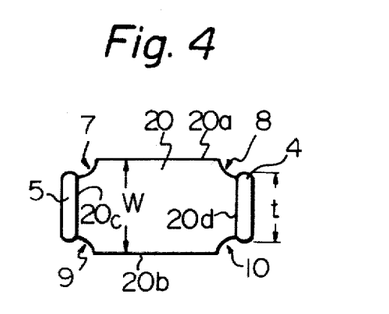
FIG. 4 is a brief plane view of the chip capacitor according to the present invention.
Figure 5:
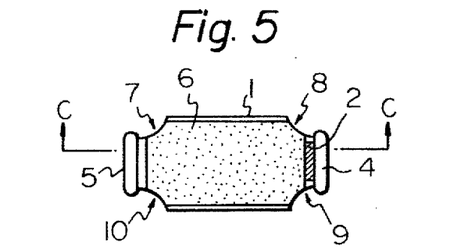
FIG. 5 is the detailed plane view of the chip capacitor of FIG. 4.
Figure 6:
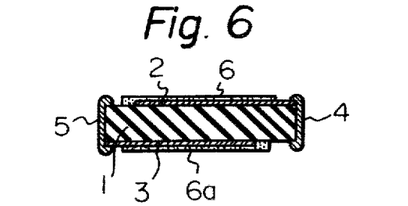
FIG. 6 is the vertical cross sectional view at the line C—C of FIG. 5.

The first embodiment of the present chip capacitor is shown in FIGS. 4, 5 and 6. In those figures, the half assembly 20 is substantially a rectangular thin flat plate with the recesses 7 through 10 at the corners, and comprises a dielectric body 1 made of bariumtitanate, titanium oxide or other dielectric material, a pair of conductive electrode patterns 2 and 3 attached on the surfaces of the dielectric body, and protection layers 6 and 6a made of glass or plastics which covers said electrode patterns 2 and 3. The half assembly 20 has a pair of parallel long sides 20a and 20b, and a pair of parallel short sides 20c and 20d, which are substantially perpendicular to those long sides. At the junction points of the long sides and the short sides, the recesses 7, 8, 9 and 10 are provided as shown in the figures. Along the entire short sides 20c and 20d, the terminals 5 and 4 which are silver paste painted with brush are provided. Therefore, due to the presence of the recesses 7 through 10, the terminals 4 and 5 do not reach to the extension of the long sides 20a and 20b.

Figures 7A, 7B:
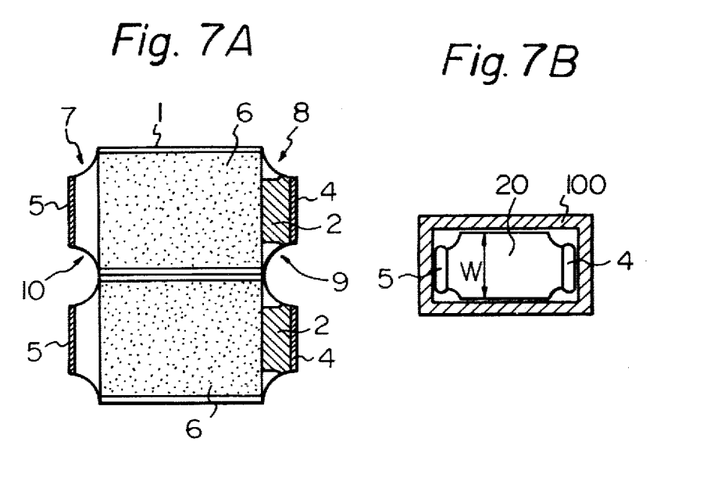
FIG. 7A shows the plane arrangement of two capacitors according to the present invention.
FIG. 7B is the top view of the stacked capacitors according to the present invention.

When a plurality of chip capacitors of FIG. 4 are arranged on a plane so that the long side touches with that of the adjacent capacitor as shown in FIG. 7A, the terminals 4 and 5 do not touch with those of the adjacent capacitor, due to the presence of recesses 7 through 10. Therefore, the trimming of the capacitance by cutting an electrode pattern, and/or the measurement of the capacitance can be carried out effeciently in the arrangement as shown in FIG. 7. Further, since the half assembly 20 does not have the corner, the thickness of the silver paste can be thin compared with that of a prior capacitor, and then, the stack and/or the automatic mounting of a capacitance is easy.

Further, it should be appreciated that the length t (see FIG. 4) of the terminals 4 and 5 is shorter than the width W of the half assembly 20 due to the presence of the recesses 7 through 10, no fat portion as mentioned in FIG. 3C is provided in the present chip capacitor. Therefore, when the present capacitor is stacked in the magazine 100 as shown in FIG. 7B, the inner width of the magazine 100 can be almost the same as the width W of the half assembly 20. Therefore, the tight mounting of a capacitor in the magazine is effected, and thus, the automatic mounting of a capacitor on a printed circuit board from the magazine is carried out efficiently with no trouble.

Figure 8A:
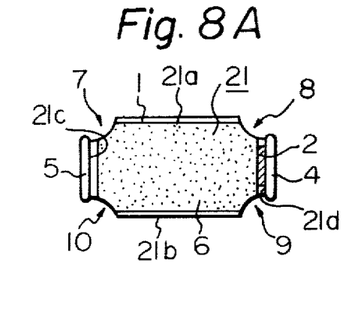
FIG. 8A is the plane view of another embodiment of the chip capacitor according to the present invention.
Figure 8B:
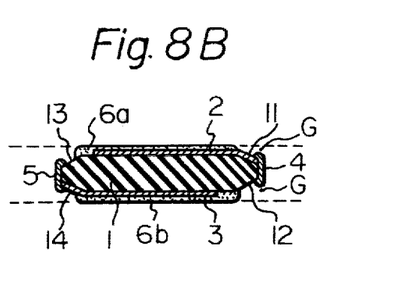
FIG. 8B is the vertical cross sectional view of the chip capacitor of FIG. 8A.

FIGS. 8A and 8B show the structure of the second embodiment of the present chip capacitor. In those figures, the half assembly 21 is substantially a thin flat rectangular plate having a dielectric body 1, a pair of electrode patterns 2 and 3, and a pair of protection layers 6 and 6a. The dielectric body 1 has also recesses 7 through 10 at the corners. Along the short sides 21c and 21d, a pair of terminals 5 and 4 are provided by painting silver paste on the short sides of the dielectric body 1. The feature of the embodiment of FIGS. 8A and 8B is the presence of tapers 11 through 14 of the dielectric body 1 as shown in FIG. 8B. The tapers or slopes 11 through 14 are provided so that the thickness of the dielectric body 1 at the center portion is larger than that at the ends of the long sides 21a and 21b. Accordingly, the terminals 4 and 5 which are provided at the extreme ends of the tapers are within the extension of the surfaces of the half assembly 21 as shown by the dotted line in FIG. 8B. Therefore, it should be noted that an air gap G is obtained between a terminal 4 or 5, and the extension (dotted line) of the surface of the half assembly 21.

Figure 9:
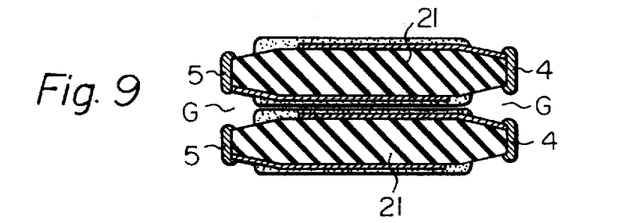
FIG. 9 shows the stacked capacitors of the embodiments of FIGS. 8A and 8B, FIG. 10A, FIG. 10B and FIG. 10C are the modifications of the embodiments of FIGS. 8A and 8B.

Since the half assembly is tapered, when capacitors are stacked as shown in FIG. 9, the terminals 4 and 5 do not contact with the terminals of the adjacent capacitor. Therefore, the height of the stack is not affected by the presence of the painted terminals, and no problem mentioned in accordance with FIG. 3B arises. Therefore, the automatic mounting of a chip capacitor utilizing a magazine is carried out efficiently.

Figure 10A:
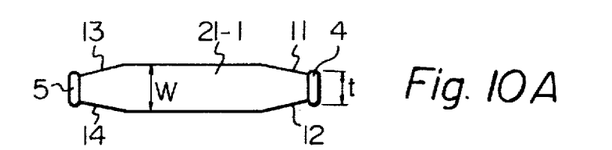
Figure 10B:
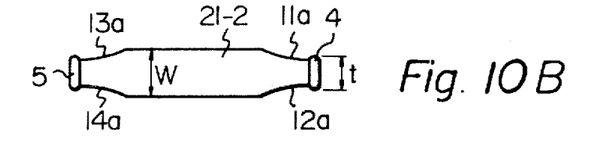
Figure 10C:
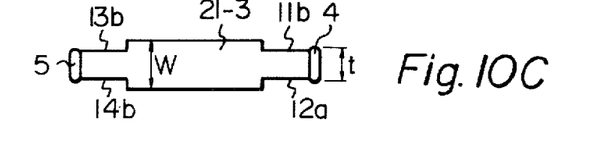

FIGS. 10A, 10B and 10C show some modifications of the structure of a half assembly. The half assembly 21-1 in FIG. 10A is the same as that of FIG. 8B, and has tapered portions 11, 12, 13 and 14. The half assembly 21-2 in FIG. 10B has curved tapers 11a, 12a, 13a and 14a, while the tapers 11 through 14 in FIG. 10A are linear. The half assembly 21-3 in FIG. 10C is wide at the center portion, and is narrow at both the extreme ends as shown by 11b, 12b, 13b and 14b. zn all the embodiments of FIGS. 10A, 10B and 10C, it should be noted that the width W at the center portion of a half assembly is larger than the length t of terminals 4 and 5, therefore, those embodiments can provide the same effect when stacked.

FIGS. 11A and 11B, and FIGS. 12A and 12B show another embodiment of the present chip capacitor. The difference between those capacitors and the embodiments in FIGS. 4 through 6, and FIGS. 8A and 8B is that the electrodes 2 and 3 in FIGS. 11A and 11B and FIGS. 12A and 12B are buried in the dielectric body, while the electrodes of the previous embodiments are provided on the surface of the dielectric body. The half assembly 22 in FIGS. 11A and 11B has a dielectric body 1 and a pair of electrodes 2 and 3. The four corners of the half assembly 22 are recessed as shown by the reference numerals 7, 8, 9 and 10. The terminals 4 and 5 are attached at the extreme ends of the half assembly 22. As mentioned previously, the length of the terminals 4 and 5 is shorter than the width of the half assembly. In the half assembly 22, the dielectric body 1 has three layers 1a, 1b and 1c. The middle layer 1b is sandwiched by the pair electrodes 2 and 3 for composing a capacitance, and other layers 1a and 1b cover the electrodes 2 and 3. One of the outside layers of 1a and 1c is thicker than the inner layer 1b in order to mechanically strengthen a capacitor. Thus, the outer layers of 1a and 1c double as a protection layer for chemical and/or mechanical disturbances. Preferably, the thickness of the inner layer 1b is $5-50\mu$, the thickness of the thicker outside layer 1c is $100-1000\mu$, and the electrodes 2 and 3 are thin layers made of silver, palladium, platinum or other conductors of high melting temperature and the total size of a capacitor is for instance $3 \times 5 \times 1$ mm.

Figure 11A:
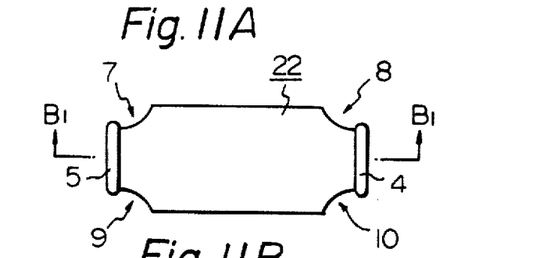
FIG. 11A is the plane view of another embodiment of the chip capacitor according to the present invention.
Figure 11B:
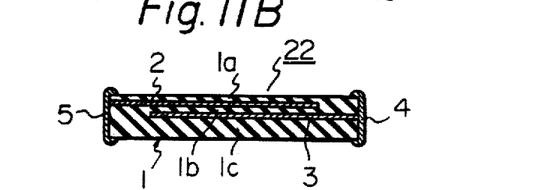
FIG. 11B is the vertical cross sectional view at the line $B_1$—$B_1$ of FIG. 11A.
Figure 12A:
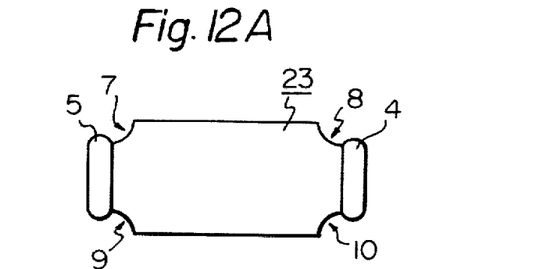
FIG. 12A is the plane view of still another embodiment of the chip capacitor according to the present invention.
Figure 12B:
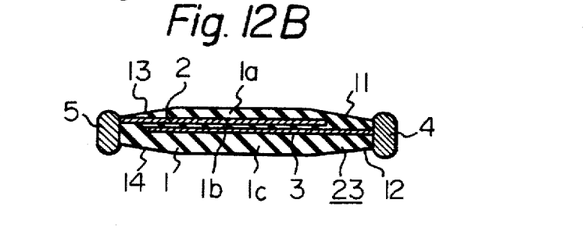
FIG. 12B is the vertical cross sectional view of the chip capacitor of FIG. 12A.

FIGS. 12A and 12B are the same as that shown in FIGS. 11A and 11B, except that the dielectric body 1 of the half assembly 23 in FIGS. 12A and 12B has tapered portion 7 through 10. Of course those tapers can be not only linear, but also curved or circular as shown in FIG. 10B, and stepwise as shown in FIG. 10C.

Due to the presence of the outer layers 1a and 1c, the thickness of the inner layer 1b can be sufficiently thin, and a large capacitance is obtained in a small size of a capacitor. Further, since the thick protection layer 1c is provided, a half assembly is not curved in a sintering or heating process when manufacturing a capacitor.

Figure 13A:
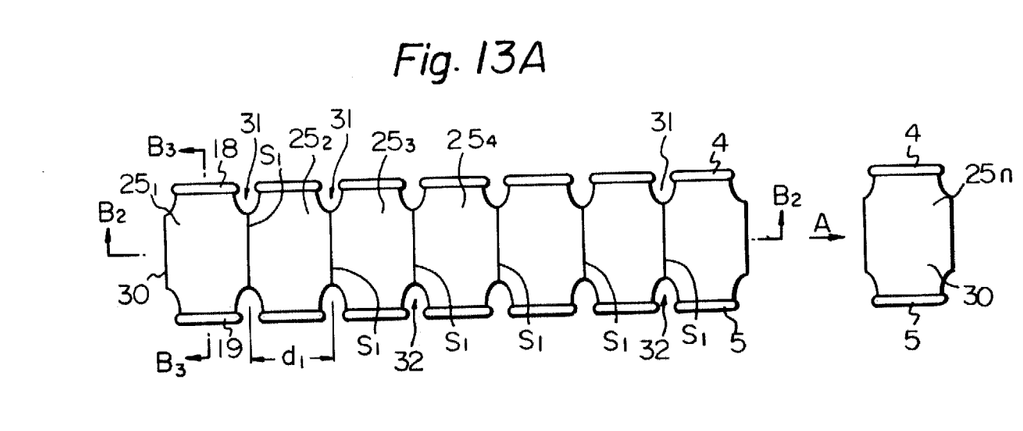
FIG. 13A is the plane view of the embodiment of the chip capacitor assembly according to the present invention.
Figure 13B:
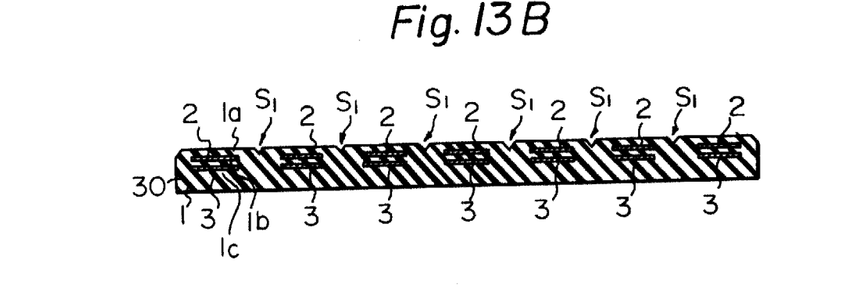
FIG. 13B is the cross sectional view of the chip capacitor assembly at the line $B_2$—$B_2$ of FIG. 13A, FIGS. 14A and 14B show the pattern of the electrodes of the chip capacitor according to the present invention.

FIGS. 13A and 13B show the modification of the embodiments of FIGS. 11A and 11B, and/or FIGS. 12A and 12B, and FIG. 13A is the plane, FIG. 13B is the cross sectional view at the line B2—B2 of FIG. 13A. The cross sectional view at the line B3—B3 of FIG. 13A is either FIG. 11B or FIG. 12B. The feature of the embodiment of FIGS. 13A and 13B is that this embodiment has a plurality of connected capacitors.

In FIGS. 13A and 13B, the reference numeral 30 is a dielectric substrate made of barium titanate, titanium oxide or other dielectric materials. The substrate 30 is in an elongated rectangular shape and has a linear slit $S_1$ in every predetermined period $d_1$. The slit $S_1$ is provided at the position where each capacitor element is divided, and the slit can be either a slit, or a continuous plurality of small holes.

The area on the substrate 30 divided by the slit $S_1$ composes a chip capacitor element ($25_1$, $25_2$, $25_3$ ...) and each chip capacitor element has substantially the same structure as that described in accordance with FIGS. 11A and 11B or FIGS. 12A and 12B. That is to say, each chip capacitor element ($25_1$, $25_2$, $25_3$ et al) has a dielectric body comprising layers 1a, 1b and 1c, and a pair of electrodes 2 and 3. The electrodes 2 and 3 sandwiches the thin dielectric layer 1b, and other dielectric layers 1a and 1c cover the electrodes 2 and 3. The terminals 4 and 5 are electrically connected to the electrodes 2 and 3 for the coupling with outer circuits. Further, there are provided a pair of U-shaped space 31 at the extreme ends of each slit $S_1$, and of course those U-shaped space 31 function as recesses 7, 8, 9 and 10 of a chip capacitor shown in FIGS. 11A and 11B or FIGS. 12A and 12B. It should be appreciate of course that a block of capacitors shown in FIGS. 13A and 13B are divided a plurality of chip capacitors as shown in FIGS. 11A and 11B or FIGS. 12A and 12B.

As described above, the embodiment of FIGS. 13A and 13B has the advantage that when a plurality of capacitors are mounted on a printed circuit board like a delay circuit, a block of capacitors can be mounted as it is on the printed circuit board without dividing each capacitor element. That feature facilitates the reduction of the manufacturing cost of a delay line, the reduction of the manufacturing steps, the reduction of the size of a delay line, and/or the high density of mounting of electronic components. Further, when each separate chip capacitor is necessary, a chip capacitor can be obtained by breaking the element ($25n$) along the slit $S_1$ as shown by the arrow A in FIG. 13A. Also, it should be appreciated that although a block 30 in FIG. 13A has a plurality of capacitors, each capacitors on the block board are electrically independent from one another, and so the measurement of the characteristics of a capacitor and/or the selection of a capacitor according to the measured characteristics is carried out without breaking each chip capacitor. Further, since a block has a reasonable size, it is convenient to keep and/or to handle capacitors, although each chip capacitor is too small to handle.

Figure 14A:
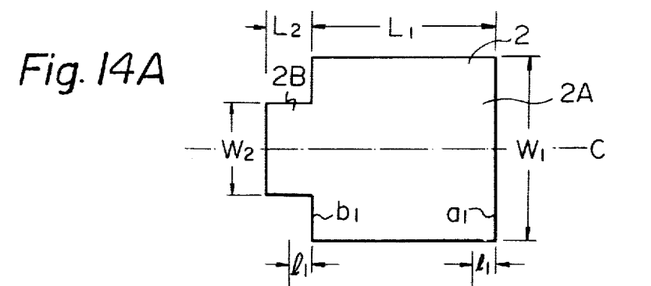
Figure 14B:
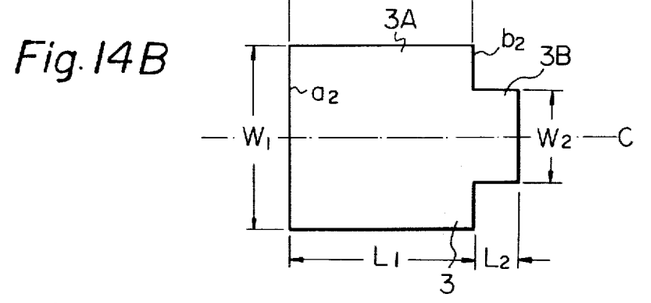
Figure 14C:
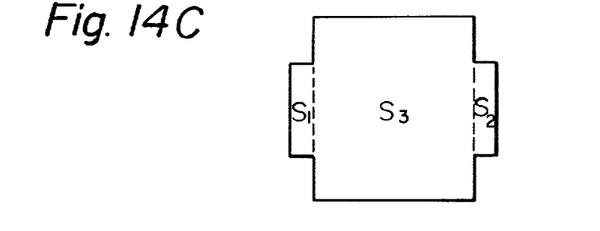
FIG. 14C shows area that the pair of electrodes confront with each other.
Figure 14D:
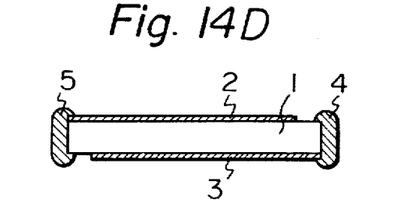
FIG. 14D is the cross sectional view of the chip capacitor which utilizes the electrodes of FIGS. 14A and 14B.
Figure 14E:
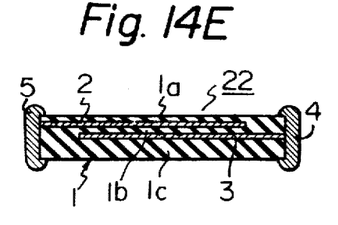
FIG. 14E is another cross sectional view of the capacitor of FIGS. 14A through 14B.

Next, the arrangement of the electrodes 2 and 3 will be described in accordance with FIGS. 14A through 14C. That arrangement of the electrodes can be applicable to all the embodiments described before including FIGS. 4 through 6, FIGS. 8A and 8B, FIGS. 10A, 10B and 10C, FIGS. 11A and 11B, and FIGS. 12A and 12B, although only two sectional views are drawn in FIGS. 14D and 14E for the sake of the simplicity of the drawings.

The electrodes 2 and 3 which are made of silver, platinum, palladium or other conductive material of high melting temperature, or alloy of those materials are painted on a dielectric layer through a silk screen printing process, and after the electrodes and the terminals are painted on the dielectric body, the assembly is sintered or heated to about 1350° C. in a furnace.

Each of electrodes 2 and 3 has a relatively rectangular large first portion 2A or 3A having the length $L_1$ and the width $W_1$, and a relatively small second portion 2B or 3B having the width $W_2$. The small portion is integral with the large portion, and the small portion is preferably positioned on the center line C of the large portion. Further, the width $W_2$ of the small portion is designed to be approximately $\frac{1}{2}W_1$.

The pair of electrodes 2 and 3 sandwich the dielectric body 1, and those electrodes are positioned so that the extreme left side $b_1$ of the large portion 2A of the first electrode 2 is inside the extreme left side $a_2$ of the large portion 3A of the second electrode 3 by the length $l_1$, where $l_1$ is shorter than the length $L_2$ of the small portion. Accordingly, the extreme right side $a_1$ of the large portion 2A of the first electrode 2 is positioned automatically outside the extreme right side $b_2$ of the large portion 3A of the second electrode 3. Therefore, the confronting area S between the electrodes 2 and 3 is the sum of the areas $S_1$, $S_2$ and $S_3$ as shown in FIG. 14C, where $S_1$ is the confronting area between the small portion 2B of the first electrode 2 and the large portion 3A of the second electrode 3, the area $S_2$ is the confronting area between the large portion 2A of the first electrode 2 and the small portion 3B of the second electrode 3, and the area $S_3$ is the confronting area between the large portion 2A of the first electrode 2 and the large portion 3A of the second electrode 3. Accordingly, it should be appreciated that the following formulae are satisfied.

$$S_1 = W_2 \times l_1, S_2 = W_2 \times l_1, \text{ and } S_3 = W_1 \times (L_1 - l_1)$$

Figure 15:
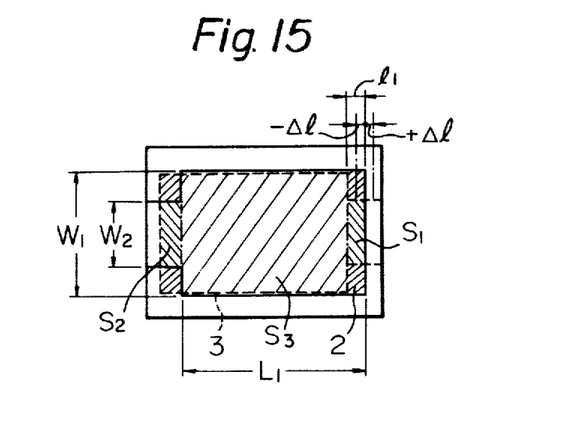
FIG. 15 is the explanatory drawing for the explanation of the operation of the electrodes shown in FIGS. 14A and 14B.

In the above situation, it is assumed that the positioning of the electrodes 2 and 3 has an error by $\Delta l$ in the longitudinal direction of the electrodes (the direction of $L_1$) as shown in FIG. 15. Then, the each area $S_1$, $S_2$ and $S_3$ will change as follows.

$$S_1 = W_2 \times (l_1 + \Delta l), S_2 = W_2 \times (l_1 + \Delta l) \text{ and}$$
$$S_3 = W_1 \times (L_1 - l_1) - 2\Delta l(W_1 - W_2)$$

Accordingly, the increment $\Delta S$ of the area is;

$$2W_2 \cdot \Delta l - 2\Delta l(W_1 - W_2) = \Delta l(4W_2 - 2W_1)$$

Since the electrodes are designed so that the relationship $2W_2 = W_1$ is satisfied, said increment $\Delta S$ is substantially zero. Accordingly, it should be appreciated that by utilizing the electrodes of the shape shown in FIGS. 14A and 14B, the capacitance of a capacitor is held constant although the positioning of the electrodes has the error in the longitudinal direction. Of course the above analysis is available when the error $\Delta l$ is either positive or negative. It should be also appreciated that the conventional silk screen painting method can provide the very accurate positioning of the electrodes in the width direction (the direction of $W_1$). Therefore, a capacitor with the accurate capacitance is obtained by utilizing the electrode structure of FIGS. 14A and 14B.

Figure 16:
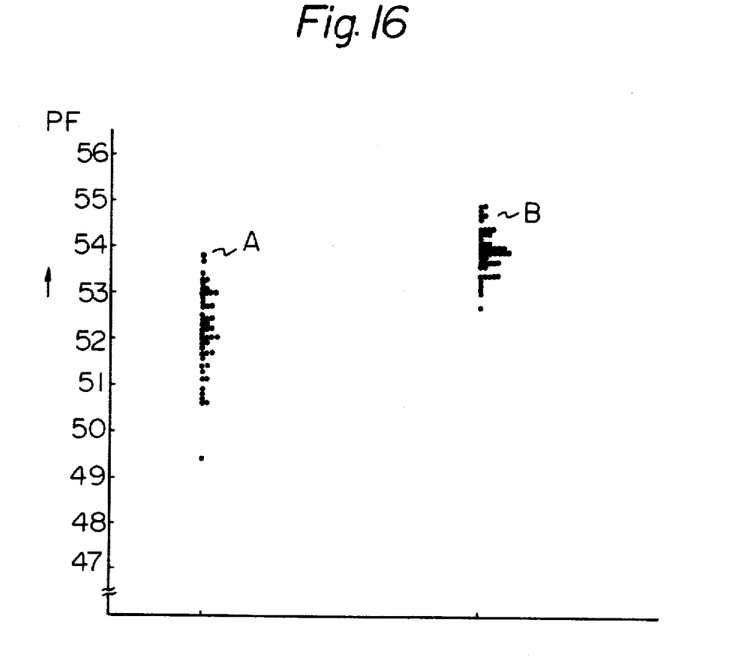
FIG. 16 shows the graph showing the result of the sample test of the chip capacitor.

FIG. 16 shows the result of the sample test concerning the distribution of the capacitance. In FIG. 16, each dot shows each sample capacitor, and the group A is the result of a prior capacitor which does not have a small portion in electrodes, and the group B shows the result of the present capacitor having the electrodes as shown in FIGS. 14A and 14B. As apparent from FIG. 16, the capacitance of the prior capacitor in the group A distributes in the range from 49.4 pF to 53.8 pF, and the difference between the maximum capacitance and the minimum capacitance is 4.4 pF. While the capacitance of the present capacitor in the group B distributes in the range from 52.7 pF to 54.9 pF and the difference between the maximum capacitance and the minimum capacitance is 2.2 pF. Therefore, said difference of the present capacitor is only half of that of the conventional capacitor.

Finally, some modifications of the present capacitor will be described.

Figure 17:
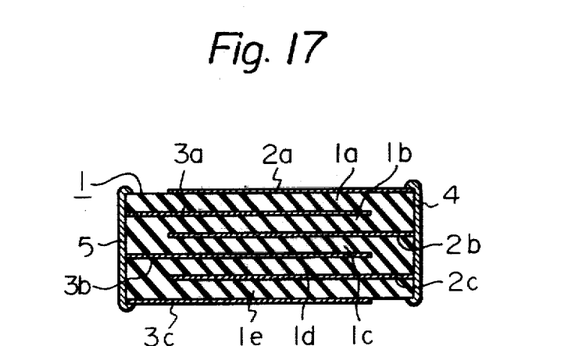
FIG. 17 shows the cross sectional view of the still another embodiment of the present chip capacitor.

FIG. 17 is one of the modifications of the present capacitor, in which three pairs of confronting electrodes 2a through 2c and 3a through 3c are laminated. Those electrodes sandwich the dielectric layers 1a through 1e as shown in the drawing. The plane view of the capacitor of FIG. 17 is the same as FIG. 4, which has the recesses at four corners. Further, the embodiment of FIG. 17 which has multiple pairs of electrodes is applicable to the embodiments of FIG. 8B which has a tapered dielectric body, the embodiment of FIGS. 10B and 10C which have the particular cross sectional view, the embodiment of FIG. 11B which has the protection layer 1c, the embodiment of FIG. 13 which has a plurality of capacitor chips on a substrate, and the embodiment of FIGS. 14A through 14C which has the particular structure of electrodes.

Another modification is the use of the colored protection layer. For instance, in FIG. 5 and FIG. 6, the protection layers 6 are colored, like green, blue, brown red, or black. The colored protection layer is provided by inserting a small amount of oxide of $N_i$, $C_o$, $C_r$, $M_n$, $C_u$, $F_e$ or carbon in a glass paste or plastics, before sintering or heating a capacitor. Since the colored element is very small amount, the change of the characteristics of a capacitor by adding the color is negligibly small. The capacitor with colored protection layers has the advantage that each particular color provides the easy differentiation of a capacitor. That is to say, since a chip capacitor is very small, the symbol or characters printed on the capacitor is not easy to read, and can not function to differentiate a capacitor. While, the present colored capacitor can be differentiated easily by the particular color on the capacitor. Of course the embodiments of the colored protection layers are applicable to all the embodiments disclosed in the present specification.

As described above in detail, the present capacitor can provide the convenient automatic mounting of the capacitors on a printed circuit board, with the accurate capacitance. Thus, the present chip capacitor has the many applications in the electronics appliances.

From the foregoing it will now be apparent that a new and improved capacitor has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A capacitor assembly comprising an elongated rectangular dielectric body, the dielectric body having a plurality of pairs of U-shaped spaces along the longitudinal sides thereof and a slit provided between each pair of U-shaped spaces on the surface of the dielectric body wherein said slits divide the dielectric body into a plurality of body elements, each of said body elements having a pair of opposed electrodes positioned within the dielectric body, and a pair of terminals provided at the opposite sides of the dielectric body positioned between said U-shaped spaces and electrically coupled with corresponding electrodes.

2. A capacitor according to claim 1, wherein said electrodes are fixed on the long side surfaces of the dielectric body.

3. A capacitor according to claim 1, wherein said electrodes are embedded in the dielectric body, providing an inner dielectric layer sandwiched by electrodes and a pair of outside dielectric layers.

4. A capacitor according to claim 1, wherein said dielectric body is tapered so that the thickness of the center portion of the dielectric body between said long sides is larger than the thickness at the terminal ends thereof and wherein said terminals are fixed on the dielectric body.

5. A capacitor according to claim 1, including at least two additional pairs of opposed electrodes.

6. A capacitor according to claim 3, wherein one of the outside dielectric layers is thicker than the other outside dielectric layer.

7. A capacitor according to claim 1, wherein each of said electrodes has a substantially rectangular first portion having the width $W_1$, and a substantially rectangular second portion having the width $W_2$, the second portion being integral with the first portion, the value $W_2$ being approximate $\frac{1}{2}$ of the value $W_1$, and the electrodes are opposed to each other so that a part of the first portion of the first electrode opposes a part of the second portion of the second electrode, a part of the second portion of the first electrode opposes a part of the first portion of the second electrode, and the main portion of the first portion of the first electrode opposes the main portion of the first portion of the second electrode.

8. A capacitor according to claim 1, further comprising of protection layers covering said electrodes, wherein the protection layers are colored.

9. A capacitor comprising:
 (a) a dielectric body member of a substantially rectangular solid shape, said body member including a pair of parallel long sides, a pair of parallel short sides, said short sides being perpendicular to said long sides, and recessed portions wherein each edge of each of said long sides are joined to a corresponding edge of each of said short sides by said recessed portions extending therebetween such that the projection of each of the edges of said short sides do not intersect any of the edges of said long sides;
 (b) a pair of conductive, opposed electrodes having at least a portion of said dielectric body member therebetween; and
 (c) first and second terminals, said first terminal being fixed to one of said short sides and connected to one of said electrodes and said second terminal being fixed to the other of said short sides and connected to the other of said electrodes.

* * * * *